June 1, 1926. 1,587,106
P. E. EDELMAN
APPARATUS FOR AUTOMATIC PREPARATION OF PRODUCTS
Filed August 17, 1920   3 Sheets-Sheet 1

INVENTOR.
P. Edelman.

June 1, 1926.

P. E. EDELMAN 1,587,106

APPARATUS FOR AUTOMATIC PREPARATION OF PRODUCTS

Filed August 17, 1920   3 Sheets-Sheet 3

INVENTOR

P. Edelman.

Patented June 1, 1926.

1,587,106

UNITED STATES PATENT OFFICE.

PHILIP E. EDELMAN, OF NEW YORK, N. Y.

APPARATUS FOR AUTOMATIC PREPARATION OF PRODUCTS.

Application filed August 17, 1920. Serial No. 404,203.

One of the objects of the present invention is to insure uniform standard production to a definite quality of large quantities of a product the ingredients of which as well as the treatment of which tend to vary widely, and by way of example I have illustrated same by the process of preparing sweetened preserved condensed milk, though it will be understood that there are many other processes also suited to the apparatus.

Another object is to secure automatic correct cooking of a product or evaporation of a liquid to a definite percentage of total solids in the end product based upon the actual quality of such end product itself and controlled automatically thereby when a predetermined point in the processing of such product is attained.

Another object is to provide reliable accurate means to indicate when a batch of a product in process in an evaporating pan has been reduced to a definite percentage of composition and to provide auxiliary means to permit automatic shutting off of steam, water cooling line to condenser, and admission of air to break vacuum to prevent evaporation beyond the point set for.

Another object is to provide apparatus to carry out the method which is accurate, compensated in rapid changes in temperature and vacuum, sanitary, easily cleaned, harmless to the product being prepared, and adapted for practical use by inexperienced unskilled operators. Various other objects will presently appear as the method and apparatus and details thereof are hereafter set forth.

My invention is suited to the preparation of numerous products such as sugar, organic compounds, condensed soups, acetates, fractional distillation of volatile materials, etc., and in order to clearly set forth the various steps I have selected by way of example the preparation of sweetened condensed milk because it is typical and illustrates the principles generally as well.

Reference is made to the accompanying drawings in which:—

Figure 8 is a diagram with plotted curve showing how I have devised means to utilize the natural characteristic of the product under preparation after careful study, and the indicating arrows show how each element of the diagram is designed to care for definite parts of the characteristic behavior of the product concerned so that a high degree of accuracy is obtained.

Figure 12 is a plan view and Figure 13 a sectioned elevation of a modified suitable form of alternating current contact galvanometer for use as designated, whereby contact sticking is avoided.

Figure 14 is a diagram showing front elevation of a part of Figure 13 to explain the operation thereof.

Figure 15 is a diagram of a modification of the apparatus of Figure 1.

Figure 16 and Figure 17 respectively are front elevations of the correction and total solids dials used and designated 27, 28 in Figure 1.

In U. S. Patent 1,341,790, and Canadian Patent 202,399 I have shown how the compensated conductivity of a product can be utilized to control the treatment thereof chemically, and while the present work has been based and grown thereon it differs therefrom in important respects and is a new and useful improvement, as more particularly set forth hereafter and in the claims. The present method and apparatus was devised after careful study under practical plant conditions. New methods and means had to be worked out to meet operating conditions, and the present invention has withstood prolonged and rigid tests.

Figures 1, 2, 3, 4, 5, 6, 7:
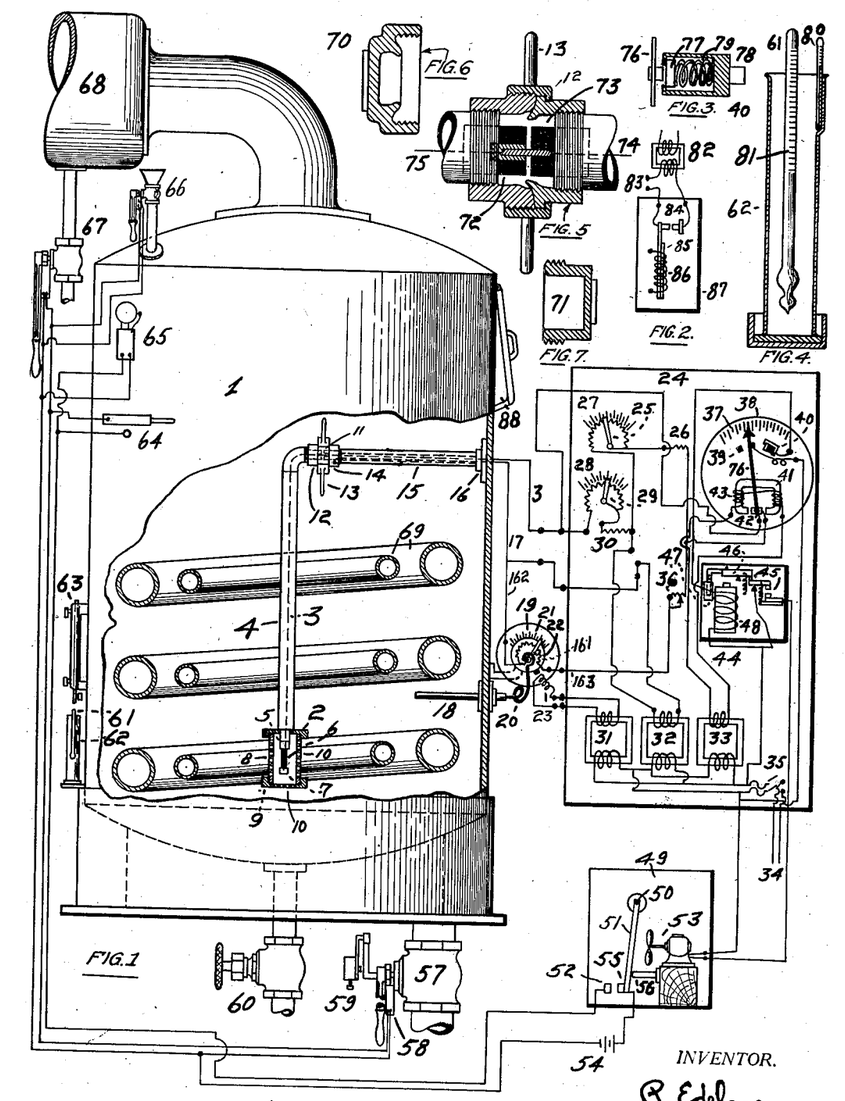
Figure 1, shows a complete assembly of the various parts in a suitable embodiment, in a combined partially sectioned front elevation of an equipped evaporating pan with the auxiliary apparatus shown diagrammatically substantially as used in practice.
Figure 2 is a detailed modification of the relay 44 of Figure 1 in which a thermically operated device is used to compensate for bubbles in the pan 1 of Figure 1, and is a diagram.
Figure 3 is a front sectioned elevation enlarged of the contact 40 of galvanometer 38 of Figure 1, which is designed to prevent sticking of contacts.
Figure 4 is a front elevation in part sectioned to show the correction hydrometer 62 of Figure 1, which is used when high accuracy is wanted despite widely varying ingredients treated in pan 1 of Figure 1.
Figure 5 is a sectioned view of the union attachment plug 14 of Figure 1 which is used to join electrode 7 to pipe 15 of the pan 1, Figure 1.
Figure 6 and Figure 7 represent respectively the end plugs used in connection with Figure 5 during cleaning, to protect the terminals 72 when same are separated. Thus 71 is screwed into 12 to keep water away from 74 while cleaning is in progress.

Referring now to Figure 1 in particular, 1 is an evaporating pan built from copper and has the usual steam coils 69, condenser 68, sample cup 63, hand support pipe 15, and other necessary appurtenances. In use, the fluid milk mixed with sugar is run into this pan, steam is applied thru 69, and a vacuum pump is assisted by cooling water thru condenser 68 to maintain a good vacuum so that water rapidly is driven off through 68. After all the milk has come up to the pan from the well where the sugar is mixed with the milk the evaporation of the batch is continued until water is driven off so that a definite percentage of total solids remains, then the steam and water are shut off, also air is admitted to break the vacuum, and the batch is dumped via valve 60. In the prior art however it has been very difficult and substantially impossible to determine accurately exactly when the batch is done to the desired point and to shut off the treatment at the right time, and it has only been feasible to roughly approximate this by taking irregular samples from sample cup 63 at various times during the process, and endeavoring to estimate the condition of the batch therefrom.

It is however not possible to get representative samples quickly enough as the evaporation proceeds while the sample taken out is being examined, so that the various batches instead of having the desired total solids content, tend to vary widely.

Now then, in pan 1, which is accessible via manhole 88, I place removably an electrode 7, to obtain a continuous sample and indication of the total solids percentage composition of the batch in process, and provide auxiliary means in a control box 24 and compensator 20 to indicate when a predetermined point is attained by the product. I thereby get accurate instantaneous indication so that the treatment can be promptly stopped before it has proceeded too far. If not stopped in time, the batch would rapidly get so heavy that it would stick to the pan 1 and not flow readily through valve 60 and subsequent canning machinery, also undesirable heat insulating sticky deposits would form on steam coils 69. Hence it is very desirable to have a reliable continuous indicator such as I provide, as it is independent from the variable judgment and irregular skill of the operator such as has to be depended upon in the old cup sampling method.

The electrode 7 can be of platinum, gold, silver, or other suitable material. I find that ordinary brass containing a small percentage of tin is a suitable alloy for this purpose. Copper however is not, as an insulating deposit is formed thereon by the milk in process. This electrode may have any suitable dimensions and in my experimental apparatus is about one inch in diameter and 3/4" long with edges smoothed. It is supported by a mica insulator 6 mounted in brass pipe 5 so that 7 is insulated therefrom but connected to insulated wire 3 in pipe 4. Pipe 4 is of brass and carries flange 2, of brass. Brass pipe 8 is removably screwed into 2 and carries removably attached to itself a brass cap 9. In my model, 8 is a two inch brass pipe about 5 inches long with inside bored smooth. All sharp corners and recesses are removed to prevent deposits of accumulated milk or sugar. The flange 2, pipe 8 and cap 9 are riddled full of holes. These are drilled with No. 40 drill and spaced $\tfrac{3}{16}$ inch apart. I find it essential to use small holes as large ones were unsatisfactory during tests. These holes do not clog up. The mica 6 was obtained by using a standard 1/2" brass spark plug, screwed into flange 2 and pipe 4. The pipe 8 and end cap 9 are thus easily removable for cleaning purposes so that electrode 7 is easily accessible for cleaning. In use of course the milk and sugar mixture flows freely through the multiplicity of holes 10 and fills the space between 7 and 2—8—9 so that when electricity is applied therebetween, it can flow from 7 to 2—8—9 and reversely in proportion to the conductivity or resistance of the said mixture in said space. Also 2—8—9 protects 6 and 7 from injury, gives a fixed length and area characteristic to the electrode member 7—2—8—9, and further prevents large bubbles occurring in practice from washing the electrode clear. The holes 10 must not be made too small or they will clog up. The mica is not affected and does not affect the milk. Since the highest temperature in pan 1 is about 220 degrees during daily sterilization, and 165 degrees during evaporation, the wire 3 is best insulated with cotton or asbestos plus a coating of rubber of high melting point composition. It is very important to have the electrode 7 positioned near the bottom and center of the pan 1 as shown to insure that it will be covered by the milk in process and not be unduly influenced by the proximity of the steam pipes 69. I find a central location about 6 inches from the bottom of pan 1 suitable.

Pipe 4 with wire 3 is detachably joined to hand pipe 15 comprised in pan 1 to permit entry of cleaner through manhole 88. As shown more particularly in Figure 5, union 12 has extension handles 13 so that no wrench is required to attach and detach pipe 4 with wire 3, to pipe 15. Pipe 15 contains two wires, one 17 soldered to 15 at 14 and the other, an extension of 3 and insulated from pipe 15. Wires 3 and 17 enter pan 1 through pipe 15 as shown, via support 16. For cleaning purposes, the pipe 4 with electrode 7 is easily removable, but during use a tight reliable joint is made electrically and mechanically.

Now since the resistance of the milk and sugar mixture varies with the temperature as well as with the composition and percentage of moisture present, also with the degree of vacuum in pan 1, I separate out and compensate for the undesired variables. To care for temperature and vacuum changes I provide a compensator 20, as I find that the two work together, a change in temperature being accompanied by a change in vacuum. The vacuum however does not change greatly. The temperature varies from 160 degrees down to 110 degrees F. ordinarily in practice as the batch nears completion, so that it is necessary to provide means to follow and compensate for such changes as rapidly as they occur. The compensator 20 which I have found by test to accurately do this is built from a Schaeffer and Budenberg reform thermometer with a removable mercury bulb 18 inserted in pan 1 as shown, to be affected by the same temperature changes that electrode 7 is. In place of the usual thermometer hand I have attached a switch contact 22 with silver contact surface. Also I have placed an insulated resistance wire coil 161 in relation to contact 22 such that 22 cuts out increments of resistance of the wire coil 161 as the temperature in pan 1 causes bulb 18 to move 22 in clockwise direction. Wire coil 161 has a total resistance of about 20 ohms in my model and is proportioned in accordance with the temperature characteristic change of the sugar and milk mixture in pan 1. One end of 161 is connected to wire 163 and the other end to wire 162 which connects with ground wire 17. As contact 22 slides over 161 therefore, there is no total interruption of circuit as 22 merely cuts out more or less of the resistance 161. This is important as it obviates fluctuations of the galvanometer needle 76. Now in order to prevent sticking of contact 22 in use, which would cause an error, I continuously vibrate 22 during use in correct phase relation with the current carried by contact 22. This is done by means of a small solenoid 23 which is energized by a transformer 31 from the same primary power source 34 that the current through contact 22 is derived from via transformer 32, and causes a gentle hum so that the error is not more than about ¼ degree F. in practice. An accurate precalibration is accordingly possible in accordance with the characteristic change of conductivity of the material treated in container 1. This is determined by taking a large number of samples, both in cup sizes and batch sizes. I find that the coefficient of change in resistance per degree change in temperature is different on actual batch samples than on cup samples, due doubtless to the effect of vacuum on the milk.

Now milk has a high temperature coefficient. On cup samples this may be as much as 2.3% per degree F., that is the resistance decreases with increase of temperature, approaching however a limit at the higher temperature of 160 degrees F. used in practice. An increase of vacuum also affects the resistance of the milk and sugar mixture, the resistance being higher the higher the vacuum. By repeated tests and averages thereof I find that a satisfactory means of closely approximating the temperature characteristic can be had once for all and subsequent batch tests at various temperatures prove this. For sugar and milk this appears to be closely 1.33 for the range 120 degrees F. to 140 degrees F., that is the resistance of the same milk and sugar mixture is 1.33 times as much at 120 degrees than at 140 degrees, under a vacuum in practice, but since the relation is not exactly a straight line I have had to modify same by experiment. It is understood then that the best way to get the correct coefficient is by actual experiment. Cup samples showed 1.5 on an average instead of 1.33, and at present at some points I am using as little as 1.29 for the slope in this range. The manner of adjusting this in practice is simple because I provide in series with the temperature operated resistance 161 an adjustable fixed resistance member 36 in box 24. 36 is simply made with the resistance sufficient to balance against the electrode resistance for a definite composition of the milk and sugar at a definite temperature as 140 degrees F. when contact 22 is indicating at 140 degrees on thermometer scale 19, say at point 21. Then the resistances are proportioned by adjusting 36 so that balance is maintained for the same composition at other temperatures. This trial method is preferable to all cup sample attempts as it gives the actual operating conditions. This will be presently more fully explained in connection with Figure 8.

To return to Figure 1, the control box contains an alternating current galvanometer 38, a relay 44 actuated when the contact 40 of galvanometer 38 is reached by its pointer 76, a switch 35 to attach the power line 34 to the apparatus, fixed resistance members 26, 30, 36, and calibrated resistance dials 25, 29, also transformers 31, 32, 33 and necessary connecting wires. This control box can be remotely located if desired but is best placed close to pan 1. In my model the box is about 12″ x 12″ x 6″ and in the drawing it has been necessary to enlarge the proportions for clearness.

The galvanometer 38 has a laminated iron field 41 energized by coils 43 so as to be fully saturated. Then slight fluctuations in the voltage at 60 cycle 110 V. A. C. terminals 34 do no appreciable damage to the indication. The moving coil 42 is connected as shown to receive current in substantially correct phase relation when the balance of the circuit is destroyed, so that pointer 76 deflects to stop 39 when the material under test connected by electrode 7 has less resistance than the point set for on dial 28 of resistance 29, but swings over to contact 40 when the resistance of the material under test connected by 7 changes so that it just slightly is higher than the point set for on dial 28. Scale 37 is made to show condition between 39 and 40, and the zero test position for the needle 76 when there is no current through switch 35 is about three divisions from contact 40. Contact 40 is preferably made as shown in Figure 3, presently to be described.

The relay 44 may be any suitable A. C. relay as shown with energizing coil 48 pulling armature 46 down against a small air dash pot 47. This dashpot integrates fluctuations of contact 40 which may occur transiently when a bubble washes against electrode 7, so that a steady contact at 40 is necessary to actuate relay 44. When coil 48 pulls down 46 it permits contacts 45 to close and actuate suitable valves and signals as hereafter set forth.

The small transformers 31, 32, 33 insulate the line 34 from the pan 1 so that there is no danger of shocks or short circuits. The transformer 32 has a secondary voltage of 6 volts in my model. It is important to adjust this voltage to avoid gassing at the electrode 7. The secondary of 32 is fed into the bridge as shown. Call the resistance of the material under test at the electrode arm "B". Call the resistance 36 in use plus the resistance of 161 from end 163 to contact 22, "D". Call the resistance 30 plus the portion of 29 in use "A". Call the resistance 26 plus the portion of 25 in use "C". Then the relation of the resistances at balance is $$A/B = C/D.$$

In my model 30 is about 9 ohms, 29 has a total of about 25 ohms, 26 has about 12 ohms, 25 has a total of about 8 ohms, 36 with 161 is proportioned as described before, so that for various settings of dial 28 calibrated in terms of total solids of the mixture surrounding electrode 7, the needle 76 of galvanometer 38 comes to test position with no current through its moving coil 42. The resistance 25 with its dial 27 is used to correct for differences in initial composition of the milk and sugar supplied to pan 1.

Now when relay 44 closes contacts 45, the slow relay 49 is operated. As shown this comprises a large flat lever 51 pivoted at 50 in box 49 and having contact 55 which can swing to contact 52 from stop 56 when the small electric motor fan 53 is actuated via contacts 45. A certain element of time, say 8 seconds is required for the motor 53 to get up enough speed to cause 55 to contact with 52. The purpose of this is to compensate for any bubbles occurring in pan 1 which are found in practice to sometimes wash the electrode 7 temporarily free from milk so that contact 45 may transiently close ahead of time. Since this is a condition which promptly restores itself, the slow relay is found to be effective so that the apparatus functions only on the true condition about electrodes 7, 2—8—9.

When contact 55 hits 52 a secondary source of current 54 causes bell 65 to ring, indicating that batch is ready, also, if switch 64 is closed, the valves 57, 67, and 67 will actuate to shut off the steam from pipes 69, cut off water from condenser 68, and admit air to pan 1, respectfully. This is accomplished by merely having the current from 54 trip spring or gravity operated valves. The steam valve 57 however aside from the tripping mechanism 58 of well known construction has an air check 59, also of standard well known construction, so that after tripping the valve 57 closes gradually. This is necessary to avoid steam hammering from sudden closing off of valve 57 which would occur without use of check 59.

A hydrometer 61 with cup 62 is provided for checking up samples from sample cup 63 long before the batch is ready, to correct for variations in the composition of the milk and sugar ingredients, especially the former. This hydrometer resembles a Twaddell instrument but is calibrated in terms of total solids and its scale corresponds to the lower left hand portion of scale 28 on box 24. The manner of use will be set forth presently.

In Figure 2, a resistance coil 86 heats expansion strips 85, when energized, thus closing contacts 84. To use this modification disconnect relay 44 and substitute 86 for coil 48. Then the terminals 83 can be used to actuate bell 65 from transformer 82 as is obvious. It takes a few seconds for the heat from 86 to warm 85 sufficiently to actuate contacts 84, so this takes care of bubbles about electrode 7, as set forth.

In Figure 3 the pointer 76 pushes against yielding platinum contact 77 supported against 78 by spring 79. Since 76 can thus make good contact without sticking I prefer and am using such contacts.

The hydrometer 61 of Fig. 4 has graduations 81 in terms of total solids or other desired reference marks which are made to correspond to the starting portion of scale 28 of resistance 29. A thermometer 80 is provided with cup 62 to insure correct hot samples for testing as set forth hereinafter. This hydrometer 61 should have a scale about 6 inches long between 61 and 63 per cent total solids, i. e. a sensitive clear calibration. Cup 62 can be of brass.

In Figure 5, the union 12 has extension handles 13 welded thereto to obviate use of wrench. A male plug 74 is carried by the half of the union which is carried by pipe 4 of Figure 1 and is insulated by bakelite or hard rubber 73. A female metal contact 75 is comprised in the other half of union 12 and insulated by 72. There is no chance for mistake in use, as contact has to be made before the union will screw together. Figures 6 and 7 show the spare plugs to close up the ends of union 12 when it is taken apart for cleaning, thus protecting the contacts 74 and 75 from the soapy water used in cleaning.

Referring now to Figure 8, there is plotted a typical family of curves showing the resistance of sugar and milk in proportions used in practice with respect to the concentration of the mixture. Now milk is a very complex organic material of colloidal nature with perhaps upwards of 100 recognizable salts present. The principal ingredients are roughly, butterfat, an insulator, water, dissolved salts, about 15% lactose, and the cane or beet sugar with its lime content added in this process. It accordingly presents a difficult problem. The sugar is a poor conductor, as is the fat, while the soluble contents in the water are fairly good conductors. I find however that regardless of the independent factors affecting the conductivity the total average follows a general law, namely that the conductivity decreases with decrease of water present. That is, as water is driven off during evaporation, the resistance increases.

In my experiments I have noted a distinct seasonal variation in the initial conductivity of the fluid milk. There is even a difference in the resistance between morning and evening milk. The lactose content is closely related to the conductivity. Thus on standing, supersaturated lactose crystallizes out from prepared condensed milk so that the conductivity one day of a finished sample is different at another date. Attempts to use a finished sample as a reference for standard are accordingly blocked. Probably some of the salts in the fluid milk are not ionized as much as others. Certainly variations in protein content have a marked effect on the initial conductivity of the fluid milk. In practice however, a factory receives milk from a wide variety of sources and I find that the supply from say 2000 different cows which enters into a single batch averages remarkably close and dependably uniformly when corrected as set forth. The factory endeavors to standardize the initial ingredients and this is a further advantage toward uniform starting conditions. For instance if the milk lacks in butterfat, as shown by initial laboratory standardization tests, cream is added to bring it up. The sugar added is then proportioned so that the relative milk and sugar solids is substantially uniform. Substantially 2689 lbs. of cane sugar is the ordinary addition to 16000 lbs. of fluid milk sent up to the pan 1 for evaporation. The ratio is carefully worked out and varied as required to maintain good quality product. For instance on three successive batches the milk to sugar ratio was 14000/2419, 13000/2276, and 14000/2419 respectively, the idea being to maintain the relative proportions of one kind of solids from the fluid milk to the solids added in the form of sugar, constant. Then the electric machine merely has to distinguish between the total solids of fairly uniform proportions and the water content, which it does admirably. Some typical consistent results obtained on batches in practice with the electric method substantially as set forth herein, as checked up by Mojonnier machine a vacuum moisture testing device in the laboratory according to U. S. Government standard specifications show the following on 15,000 to 22,000 lb. batches.

*Report from factory at Norwich, N. Y.*

| Machine set for total solids on dial. | Actual total solids by laboratory test. |
|---|---|
| 63 | 62.97 |
| 66 | 66.01 |
| 69 | 69.1 |
| 70 } Test range for corrections | 70.05 |
| 71 | 70.95 |
| 72 | 72.06 |
| 72.5 } Standard finish point | 72.53 |
| 73 | 72.97 |
| 74  Heavy finish point | 73.84 |

Such results are remarkable in comparison to hand operation where when 72.5 is tried for the result will vary from 1 to 2% therefrom, that is the solids will show by laboratory test the old way anything from 71 or under up to 74 or over, though some will of course come out about right.

Runs made with beet sugar instead of cane sugar showed no noticeable difference in calibration results. This was also true for runs on so called tank milk or milk which is re-cooked with the addition of water or fresh milk, thus confirming discovery that the compensated electrical conductivity of the mixture was a reliable indication of its concentration or percentage of total solids and water.

In Figure 8 consider a typical curve such as the one labelled E. Starting with fluid milk containing about 89% water and sugar added as aforesaid, the hot mixture sent up to the pan 1 is a rather good conductor. As concentration starts in the evaporation process there is relatively slight change in conductivity between 25 and 30% total solids in the mixture but a reversal takes place at point marked A which is around 28% and is the best conductivity point. Thereafter as water is driven off, the resistance increases steadily up to point H which represents about 50% total solids. Thereafter, as concentration continues the increase is very marked and shoots up nearly straight, so that for each percent change of total solids there is a large change in electrical resistance.

The similar curves D and F represent other batches where due to some seasonal variation in the fluid milk or other change in starting conditions the whole curve runs on a parallel track. The dotted curve G represents the same curve F taken at a higher temperature, showing how for a given percentage total solids the resistance will be less at say 140 degrees than at say 130 degrees F. With this curve the apparatus and its compensators are now understandable.

In practice the hot fluid milk with sugar addition is continuously supplied to the pan 1 during evaporation of the fluid already therein, until all the milk for a batch is up. When all the milk is up I find that the total solids concentration is usually in the neighborhood of 60% total solids up to 64% total solids. The switch 35, Figure 1 is accordingly first turned on after all the milk has come up to the pan 1, so that thereafter the resistance about electrodes 7 steadily increases as the concentration continues with the evaporation and no further addition of fluid milk.

Figures 6, 12, 13, 14, 15, 16, 17:
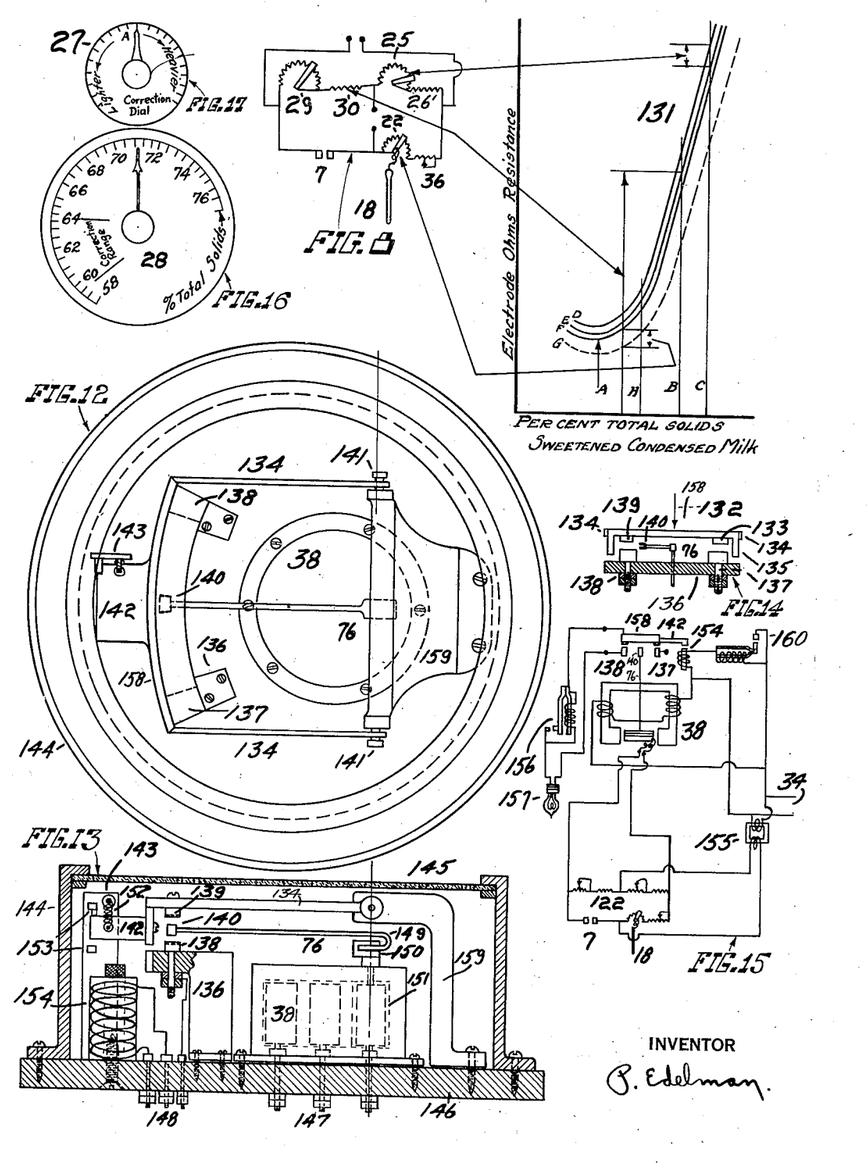

Accordingly I proportion the bridge as shown in Figure 8 so that the resistance 30, Figure 1, is about the same or in proportion to the resistance of the electrodes 7 marked by "B" on the chart, Figure 8, at 140 degrees F. which on the average then obtains in the pan 1. Then, with the resistance of 29 all cut out, a calibration is made for the range "B" to "C", cutting in resistance from 29 as required during concentration and samples taken for calibration purposes. Thus a dial like in Figure 16 is prepared once for all, since thereafter everything can be quickly corrected in proportion thereto for a particular set of electrodes 7.

Next to care for initial variations in the fluid milk and sugar mixture the correction dial 25 is provided such that when set at the middle point of 25 the resistance of 25 and 26 is enough to balance 29 and 30 for a particular percentage setting as set forth, for milk following say curve e. Then another time when the milk has some other curve, which does not need to be determined, as say F or D, a correction can quickly be made for this long before the batch is ready to strike. If this correction is not made the results will still be useful. That is, a good instrument can be had with 25 fixed at one point, but for highest accuracy on the valuable sugar and milk batches, a correction is best made.

This correction is made simply in connection with the hydrometer 61 of Figure 1 and Figure 4. When all the milk has come up or even a little before this if desired, a sample is taken out from cup 63 in usual manner, with care to be sure that it is a representative hot sample. This is run into hydrometer cup 62 and a reading is made. Now on such a hot light sample, the hydrometer is quite accurate and easily read, whereas, later, near the finish point of the batch, such a hydrometer reading is difficult on account of the viscosity of the sugar and milk at the heavier concentration.

Suppose the hydrometer shows 62% total solids or some other arbitrary mark corresponding to the scale 28 of resistance 29. The milk in pan 1 is all the time concentrating so that its resistance is increasing. The operator simply notices where the needle 76 of galvanometer 38 is on scale 37, then sets dial 28 to the mark corresponding to the hydrometer reading. This of course may change the position of needle 76 so the correction dial 27 is moved at the same time that 28 is changed, to keep the needle 76 at whatever point it last was. As will be seen from the diagram this operation merely shifts the bridge in accordance to whatever curve the particular batch of milk is following. The usual method is simply to set the dial 28 for 63% total solids. Then when the needle 76 begins to move away from stop 39, the hydrometer reading is taken. If it differs from 63% the dial 28 is reset. Meantime needle 76 will probably have moved to the right as shown in Figure 1, so just before re-setting 28, the position of 76 is noted. Then 28 is re-set to correspond to hydrometer 61's scale 81 reading, and dial 27 is immediately moved to alter resistance 25 until the needle 76 is back at its old and last position, not back to starting point off of stop 39. This operation corrects for a particular batch and the dial 27 is left alone thereafter. The dial 28 is now set for whatever finish point is desired, as for example 72.5% total solids. Then, since the sample is both continuous and self compensated for temperature and vacuum changes, the bell, Figure 1 will ring when such concentration is attained, and if the switch 64 has been previously closed, the batch will strike automatically. This enables one man to operate a pan instead of two being required, one for sampling and one for manipulation of the valves. Also the result is more accurate.

From Figure 8 it will be seen that as the temperature affects the resistance of electrodes 7 it also varies the resistance in the balancing arm 22. Thus, if at 140 degrees the characteristic curve for a particular batch is at G and as the temperature falls, during the completion of the batch, curve G shifts up towards E, the resistance 22 altered only by temperature, exactly or very closely follows this, and keeps the whole apparatus functioning on whatever characteristic curve obtains at any particularly contemporary temperature in the pan 1. Since vacuum follows temperature, correction for change in vacuum with change in temperature follows in course. Thus for a given setting of 28, as corrected, the apparatus will promptly and accurately indicate. Suppose the setting was for 73% total solids corresponding to "C" on the curve. It is seen that by the arrangement of the apparatus the operation works to the exact percentage total solids and not to a fixed resistance or conductivity point. In the example taken, the resistance might have been much less if the batch was at 73% total solids at 140 degrees. Or if it was not ready then, it might have been way up to D by the time 118 degree. F. was reached. The operator could at all times see from the instrument, just where the batch was, and as a matter of fact in practice, the various intermediate settings such as 68% total solids are used as a guide to start cutting off part of the steam and water to slow down the rate of evaporation and start cooling the batch as the finish is approached.

The proof that this is correct is seen in the results where practice follows theory, and any desired concentration in accordance with various brands made up can be set for and obtained with high degree of accuracy.

With the correction method, but one cup sample has to be taken, and that early in the batch process when there are no valves to be manipulated, so that one operator can work nicely instead of two.

Figure 9:
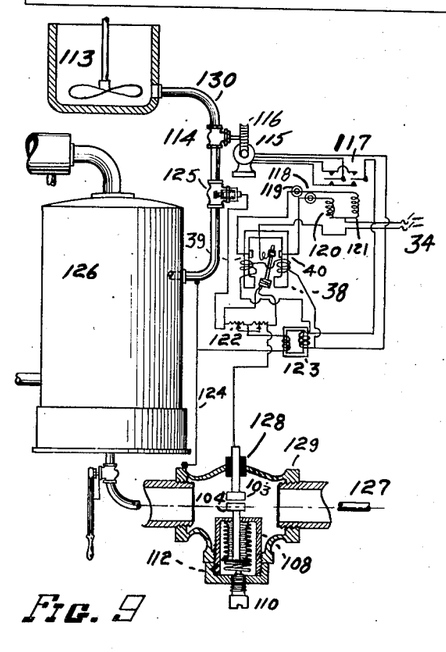
Figure 9 shows a modification of Figure 1 as a part sectioned diagram whereby the evaporation is made continuous instead of by batches.

Turning now to the modifications shown, a continuous small evaporator is shown in Figure 9 by 126. 113 is a hotwell from which the sugar and milk mixture is supplied to pan 126 thru pipe 130 and motor valve 114, also thru electrode fitting 125. The output from 126 is taken through a second electrode fitting 129, shown enlarged, and delivered to pipe 127. The electrode fitting 125 is substantially like that of 129. The latter has two electrodes 103 and 104. 104 is automatically moved to increase its distance away from 103 by a mechanism 108 as the temperature increases, and vice versa upon a falling temperature about 103 and 104. This is accomplished by use of a siphon element 108, 112, 110, which will be more particularly explained in describing Figure 11. The siphon part 112 extends under the influence of increased temperature and pulls electrode 104 with it. The electrode 103 is fixed and is insulated via bushing 128. The bridge arrangement is substantially as previously described, except that galvanometer 38 has two contacts 39, and 40 in use with two relays 120 and 121 respectively in series with indicating pilot lights 118 and 119. These relays operate contacts 117 such that the motor 115 drives the valve 114 via worm gear 116 clockwise when contact 39 is made, and counterclockwise when contact 40 is made. The electrode 125 in the hot milk gives the initial starting condition of the fluid milk and sugar mixture continuously, and the conductivity thereof is balanced against the conductivity of the thickened or concentrated product from pan 126 which flows past electrodes 103 and 104. The siphon arrangement shown keeps the conductivity between 103 and 104 substantially constant for a given concentration of the fluid thereabout, at all working temperatures, so that a direct comparison continuously between the raw and the processed fluid is obtained. As shown this is appropriately used to regulate the flow of the raw fluid thru motor valve 114 so that the product passing to pipe 127 is maintained substantially with a standard constant percentage of total solids. If it gets too heavy, the valve 114 will open further, and vice versa if the raw fluid is flowing too fast for the capacity of the evaporator 126. Current is supplied from the line 34 and is fed to the bridge 122 via transformer 123.

Figure 10:
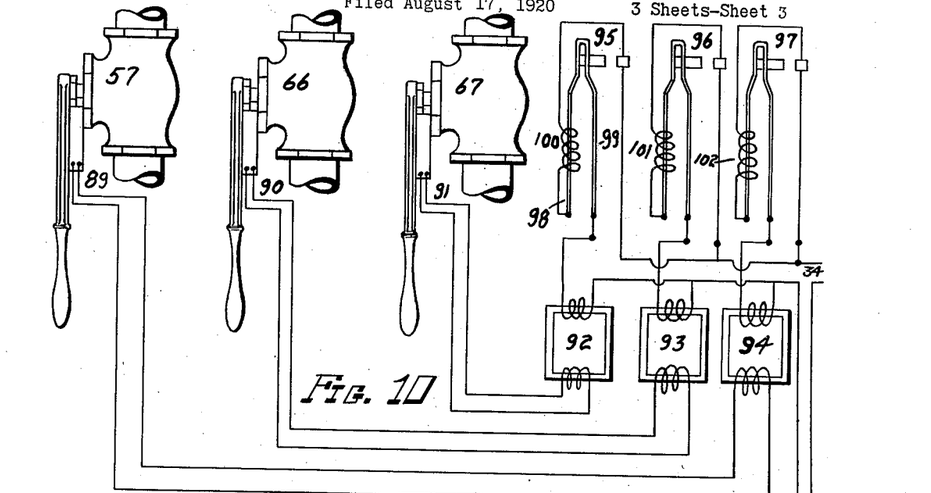
Figure 10 shows a modification of the valve controlling means of Figure 1 whereby the water, steam, and air valves are operated automatically in sequence with predetermined time interval therebetween in exact semblance of hand operation.

In Figure 10, 57 represents the steam valve of Figure 1, 66 the air valve, and 67 the water valve, each with electric actuating mechanisms 89, 90, 91 respectively connected to transformers 92, 93, and 94, the primaries of which transformers are operated in parallel through time relays 95, 96, 97 respectively from line 34 controlled by contacts 45 of Figure 1 when relay 48 is energized. The heating coils 100, 101 and 102 are however adjusted so that the time relays 95, 96 and 97 operate in proper sequence in semblance of hand control operation, that is the water, next the steam, and then the air valve, individually is operated. The relay comprises an insulated heating coil 100 wound on one of two equal brass legs 98 and 99. When heated leg 98 expands and closes contact 95. The time of closing contacts 95 can be regulated by the rate of heating of coil 100 and the distance set between the contacts.

Figure 11:
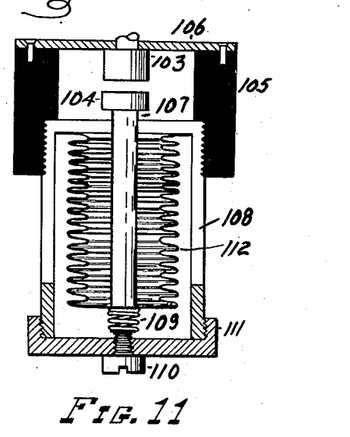
Figure 11 is a part sectioned view in elevation of a modification of the electrode 7 of Figure 1 in which the compensator is combined directly with the electrode 104, so that the distance of 104 from 103 varies with the temperature surrounding same.

In Figure 11, electrode 103 is supported by yoke 106 on insulating bushing 105 held by U-shaped support 108. Cap 111 is screwed onto support 108. Siphon tube 112 is supported at top end by 108 and contains a small amount of a volatile substance such as alcohol. 112 is a one piece copper tube rolled so as to be extensible in manner well known. Electrode 104 is carried by a U shape support 107 which slides over the top of support 108 and the bottom of 107 is fastened to the free end of siphon tube 112. The free end of 112 is restrained appropriately by spring 109 held by adjustment screw 110 so that the travel of 104 can be regulated. In use, increase of temperature of the medium around the electrodes 103, 104 and siphon tube 112 increases the distance between 103 and 104, and vice versa for falling temperature, so that for a particular concentration of the fluid around the electrodes 103, 104, the effective resistance between such electrodes can be held substantially constant, thus making the result independent of temperature fluctuations.

Figures 12 and 13 show a modified form of galvanometer in which the needle 76 of galvanometer 38 carries only a dead contact 140 which is intermittently pushed into electrical contact with contacts 139 and 138 if 76 has deflected to such position. Normally however when the needle 76 is free and not deflected sufficiently, nothing hits or touches dead contact 140. This will be seen in Figure 14 where arrow 132 indicates that bar 158 is pushed down at intervals so that stop 135 touches fibre 136. If contact 140 on pointer 76 is in position shown in Figure 14 no contact is made but when 76 moves over so that 139 touches 140 and pushes it against 138 when 158 is pushed down, then contact is made from 139 to 138 through the platinum spring strips 140. The same holds true for the other end, 133 to 137. The contacts 138, 137 are made slightly wider than 139, 133 respectively so that missing of contact with 140 will not occur when 76 is sufficiently deflected to bring 140 in alignment with the two contacts 139, 138 or 133, 137.

The manner of using this arrangement is diagrammed in Figure 15 where 122 is the familiar bridge, 7 the electrodes, 18 the compensator, 155 the transformer, 34 the line 38 the galvanometer, and 154 the magnet which pulls down 158. The magnet 154 is energized intermittently by means of thermo-relay 160 which is connected as shown so that 154 is energized on and off about once every fifteen seconds continuously. While 154 is not energized, the needle 76 can swing free. When contact is made from 158 through 140 to 138 the thermo-relay 156 flashes lamp indicator 157 to show that the point set for on bridge 122 has been reached.

In Figure 12, and Figure 13, the contact piece 158 is carried by arms 134 pivoted to support 159 in alignment with the galvanometer needle support 150. 158 carries the two contacts 139, 133 and is fastened to iron armature 142. 142 is held by spring against stop 153 at the top of bracket 143, and when magnet 154 is energized 142 is pulled down to bottom stop 153 on 143. 143 is a brass bracket with two stops 153 punched thereon. Suitable binding posts 148 and 147 are provided in the base 146 which is of bakelite. The fibre support 136 is screwed to base 146. Needle 76 is of light aluminum tubing fastened to fibre 150 via a bend 149, and carries platinum contact 140. 144 is the casing with glass top 145. 134 is pivoted to 159 by supports 141. It is thus seen that a very sensitive galvanometer 38 which would be too weak to make a good contact itself can nevertheless be used in the manner with intermittent push down contacts, also that nothing touches dead contact 140 as long as needle 76 has not swung to the limits set for. This makes a very sensitive and satisfactory arrangement eliminating contact troubles.

The dials, Figure 16 and Figure 17 may be appropriately etched or marked as shown in metal or other suitable material. Aluminum is preferred.

I have now described my invention and shown one complete illustration thereof by way of example, pointing out the method and apparatus in definite detail so that anyone skilled in the art can understand and apply same to any particular problem to which the invention is suited. Various changes can be made within the scope of the appended claims. It is important to keep electrodes 7 clean and bright daily. Otherwise very little care is required as the apparatus is capable of hard service when substantially built as set forth.

I claim:—

1. An attachment for a fluid treating vacuum pan comprising a detachable insertable set of electrodes, a temperature and vacuum compensator therefor, a control box comprising electrical circuits connected with said electrodes and compensator, and means connected thereto to indicate when a predetermined concentration has been attained by a fluid undergoing treatment in said vacuum pan without reference to temporary fluctuations in said fluid.

2. In an apparatus for use in the concentration of a material, an electrode supported by an insulator, a cooperating enclosure therefor and containing numerous holes to permit passage of a fluid, means to attach said electrode to a vacuum pan, a compensator for the effect of temperature and pressure changes, a calibrated resistance member associated with said electrode and graded in terms of the concentration of the material undergoing treatment in said vacuum pan, an associated resistance member to correct said calibration for variations in the initial condition of said material, and indicating means connected therewith to show the corrected concentration in said treated material.

3. In apparatus of the character set forth, electrodes insertable into a fluid which is subject to agitation, a perforated shield therefor to mitigate the effect of bubbles occurring in said fluid, and an electrical indicating device connected to said electrodes.

4. Apparatus for use in a treatment process comprising fluid sampling electrodes, a bubble shield and a temperature and pressure compensator therefor, an indicator connected thereto, and retarded means to actuate said indicator according to the condition attained by the mass of the fluid sampled by said electrodes.

5. A concentration indicating apparatus comprising an electrode member consisting of a metal electrode supported by an insulator, a detachable metal shield containing numerous holes cooperating with and surrounding said electrode, means to attach said electrode member to a cooking vessel, a compensator for the temperature and pressure variations in said cooking vessel, a switchboard connected to said electrode member and compensator, and a retarded indicator associated therewith.

6. In an apparatus for use in concentrating a material, testing electrodes, a shield therefor, a compensator and an indicator connected thereto, a device to calibrate said indicator with reference to the initial condition of said material before the concentrating is completed, and associated electrical circuits including a delayed relay actuated in accordance with the concentration attained by said material.

7. Apparatus to determine the condition of a material in a treating vessel comprising means to measure the electrical condition of said material and a compensator therefor consisting of an electrical resistance connected to alter the action of said measuring means, a switch arm in contact with said resistance, thermal responsive means to actuate said switch arm, and means to lift said switch arm from contact with said resistance whereby said switch arm may freely take any position on said resistance governed by said thermal responsive means.

8. In apparatus for determining the treatment of a product in process, an electrical measuring instrument including a portion of said product in its circuit, and a correcting device therefor comprising a resistance member governed according to the temperature in said product, a relay governed according to the joint action of said instrument and correcting device, and means to prevent the operation of said relay when transient fluctuations occur in said product in process.

9. Apparatus for determining concentration of a material in a cooking vessel comprising an electric sampler and indicator with means to correct for variations in the initial condition of said material and for changes in the temperature therein, and a delayed control device actuated in cooperation therewith and free from temporary fluctuations in said material due to bubbles in said cooking vessel.

10. Apparatus for completing a batch of condensed milk in process which comprises an electrode set inserted into said batch and contained in a vacuum pan, means to detach and facilitate the cleaning of said electrode set, a compensator and a control box with electrical circuits connected to said electrode set, a current source therefor, a calibrated dial to adjust said electrical circuits, a correction dial to modify said first calibrated dial adjustment, an auxiliary sampling means to check the calibration of said first dial, means actuated by said circuit to close a contact to indicate when the batch attains the concentration corresponding to the adjustment of said first dial, and means to prevent bubbles occurring in said pan from prematurely closing said contact.

11. Apparatus for the purpose set forth comprising a bridge, one arm of which is calibrated in terms of the percentage total solids of a batch of material in process to be indicated by said apparatus, a second arm of said bridge comprised by electrodes inserted into said batch to sample said material, a third arm comprised by a variable resistance member which can be adjusted according to the initial condition of said batch, and a fourth arm including a resistance member automatically governed according to the temperature of said batch, an alternating current galvanometer and a current source therefor connected to said bridge, a circuit closer governed by the deflection of said galvanometer, and a thermically actuated indicator cooperating therewith to show when a desired concentration is attained by said batch of material.

12. Apparatus for use in automatically preparing a food product which comprises a continuous electric sampler for the batch in process, an indicator, a current source, and a calibration device therefor, and means to adjust said calibration device in accordance with a check test on a portion of said batch taken before completion, whereby the treatment of said batch may be concluded at a desired stage attained and shown by said indicator.

13. Apparatus of the class set forth, comprising in combination, an electrode set, a shield therefor, a cooperating thermic compensator, an electrical indicator, a connecting electrical circuit and current source therefor, a retarded circuit closer in said electrical circuit, an adjusting device co-relating the action of said set, compensator, indicator, and circuit, and auxiliary means to correct said adjusting device.

In witness whereof I have hereunder set my hand and legal seal this 16th day of August, 1920.

PHILIP E. EDELMAN. [L. S.]